March 21, 1950     E. L. ATKINSON     2,500,976
SHOCK FORMING IMPLEMENT

Filed April 13, 1945     3 Sheets-Sheet 1

INVENTOR
E. L. Atkinson

BY

ATTORNEYS

March 21, 1950

E. L. ATKINSON 2,500,976

SHOCK FORMING IMPLEMENT

Filed April 13, 1945

INVENTOR
E. L. Atkinson
BY
ATTORNEYS

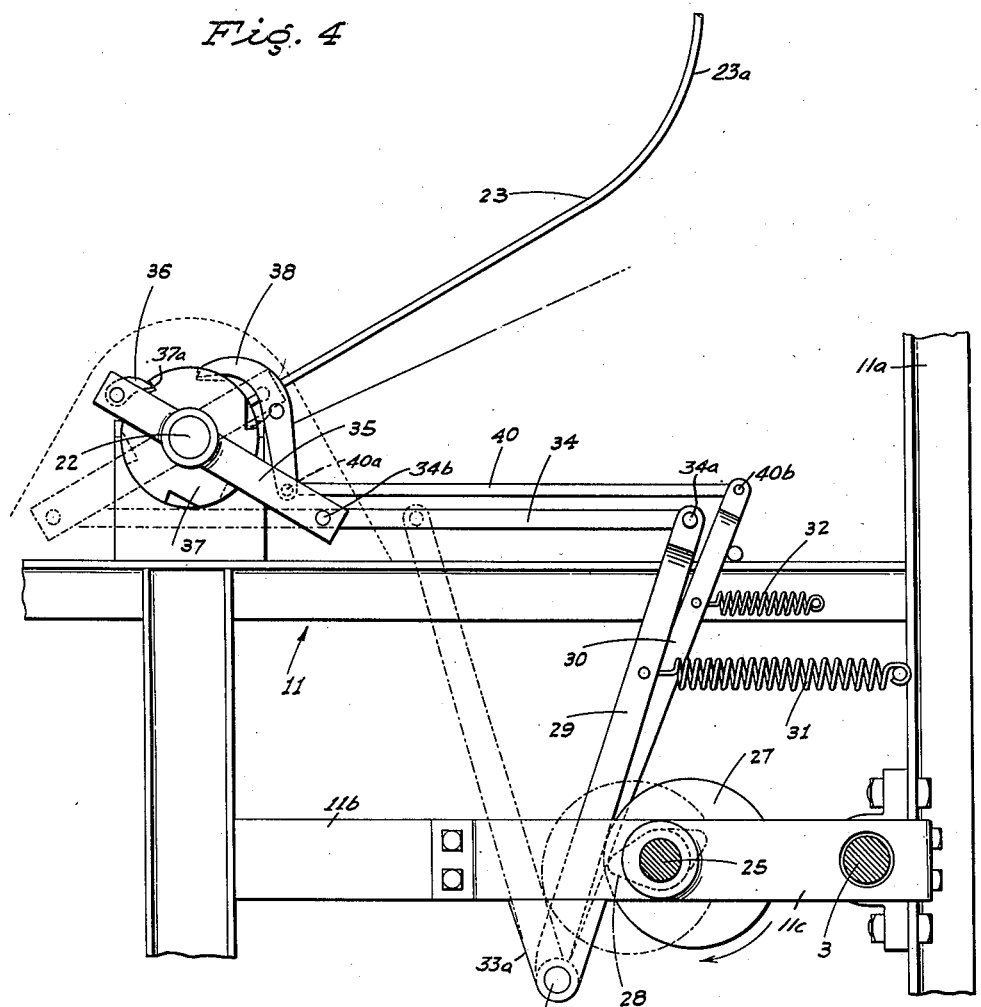
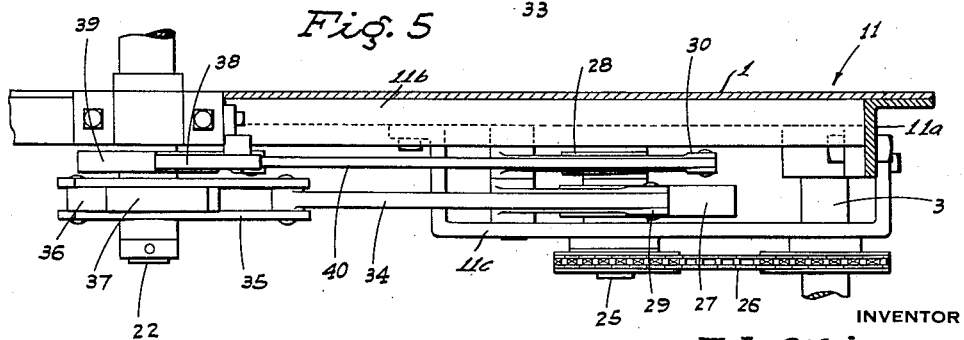

Patented Mar. 21, 1950

2,500,976

UNITED STATES PATENT OFFICE 2,500,976

SHOCK FORMING IMPLEMENT

Elmer L. Atkinson, Modesto, Calif.

Application April 13, 1945, Serial No. 588,111

7 Claims. (Cl. 56—346)

The present invention is directed in general to an improved agricultural implement.

In particular the invention relates to, and it is an object to provide, a novel implement for mechanically forming hay or other crops into shocks for drying in the field.

Another object of the invention is to provide a shock forming implement adapted for movement along the ground, and including an elevator operative, upon advance of the implement, to pick up a windrowed crop, and mechanism on the implement arranged to receive and accumulate the picked up crop from the conveyor whereby to form a shock; said mechanism functioning to intermittently discharge a formed shock from the rear of said implement onto the ground.

A further object of the invention is to provide a shock forming implement, as in the preceding paragraph, in which said mechanism includes a transversely extending reel having a plurality of radial rows of tines, disposed in circumferentially, relatively widely spaced relation on a central shaft, each row of tines forming a sweep; the reel being mounted for intermittent and predetermined rotation in a trough-like body, into one end of which the crop is fed from the elevator and out of the other end of which an accumulated quantity of said crop is intermittently fed, as a shock, by said reel.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 4 is an enlarged fragmentary side elevation of the reel actuating and control mechanism.

Figure 5 is an enlarged fragmentary plan view of the reel actuating and control mechanism.

Referring now more particularly to the characters of reference on the drawings, the implement comprises a longitudinally extending body 1 which is of generally trough-like shape but open at its rear end; said body being supported at its forward end by a transversely spaced pair of pneumatic-tired wheels 2 fixed on the opposite ends of a cross shaft 3, which is journaled in connection with the body 1 at said end. At the rear end the body 1 is supported, on opposite sides, by caster wheels 2a.

Figure 3:
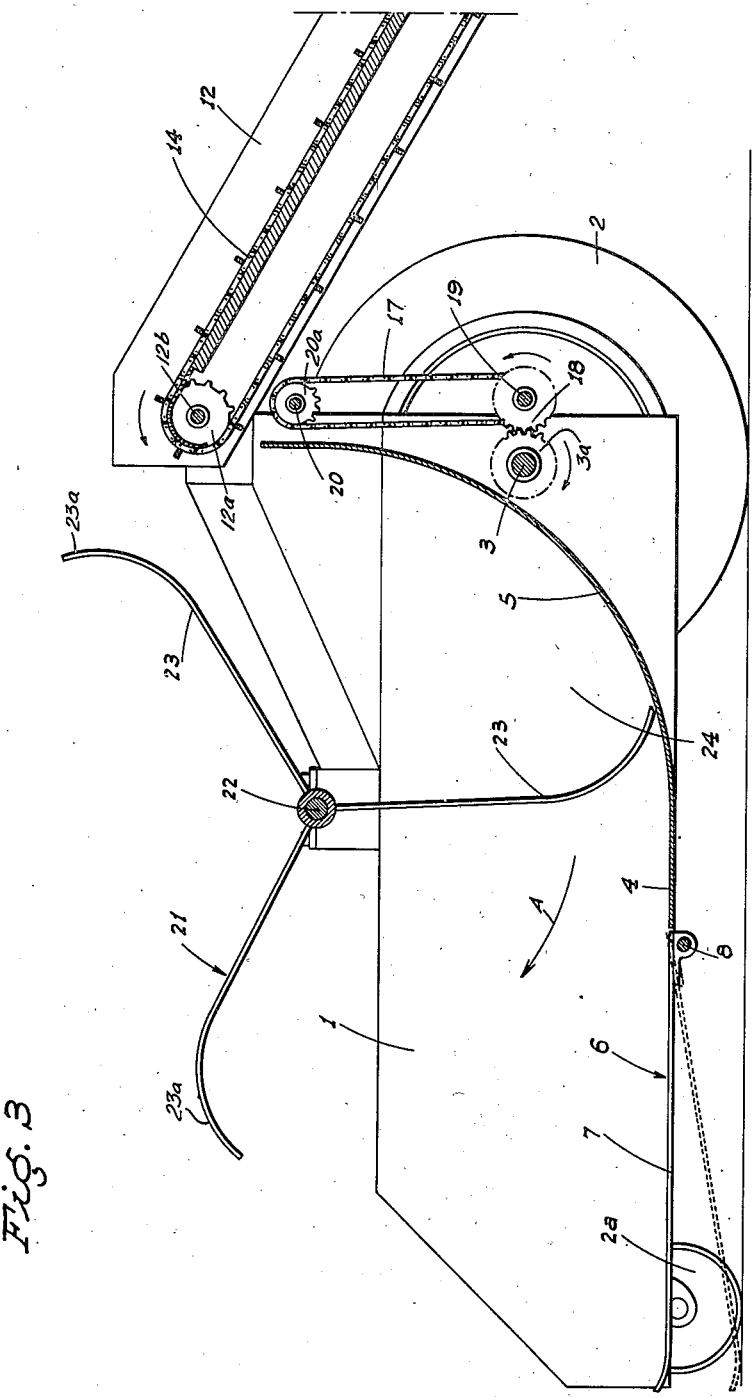
Figure 3 is a longitudinal sectional elevation on line 3—3 of Fig. 2.

The bottom of the body, which is indicated at 4, is formed at its front end portion with a forward and upward curvature, as at 5, while the rear end section 6 of the bottom 4 comprises a plurality of rearwardly extending rods 7 fixed on a cross shaft 8, whereby the section 6 can swing downward from a horizontal position flush with the bottom 4 to a rearwardly and downwardly inclined ground engaging position, as shown in dotted lines in Fig. 3. The bottom section 6 is normally maintained horizontal by means of a tension spring 9 which connects between a radial lever 10 on the outer end of shaft 8 and a point 9a on the adjacent side of the body. The purpose of the downwardly swingable bottom section 6 will hereinafter be explained.

The body 1 is formed in connection with a frame indicated generally at 11, an upstanding portion of which is indicated at 11a at the forward end of said body. A forwardly and downwardly inclined elevator conveyor 12 is pivotally connected at its upper end with the frame 11, and is supported at its lower end, from the ground, by transversely spaced caster wheels 13. The elevator conveyor 12 includes an endless conveyor or draper 14 onto which a windrowed crop is adapted to be fed from pickup shoes 15 at the forward and lower end of said conveyor. A hitch, indicated generally at 16, projects forwardly from the elevator conveyor 12 for connection in draft relation with a tractor.

As the implement is advanced along a windrowed crop, such as hay, said windrow is picked up and elevated by the conveyor 12; said conveyor being driven from the wheels 2, and with the upper run of said conveyor moving upwardly, by means of a sprocket and chain system. This system includes a pair of vertically disposed shafts 19 and 20 disposed at the rear of the frame 11 and carrying gears 18 and 20a respectively which are connected in driving relation by a chain 17. The gear 18 is driven by a gear 3a fixed to the shaft 3. On the shaft 20 is another gear 20b connected by a chain 17a with a gear 12a on the upper drive shaft 12b of the conveyor 12. The conveyor 12 discharges at its upper end into the forward end portion of the body 1.

Figure 1:
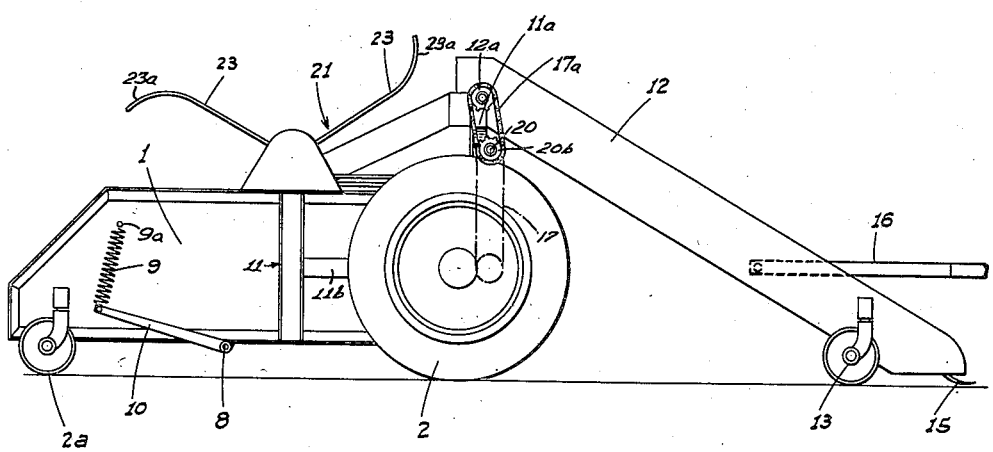
Figure 1 is a side elevation of the implement.
Figure 2:
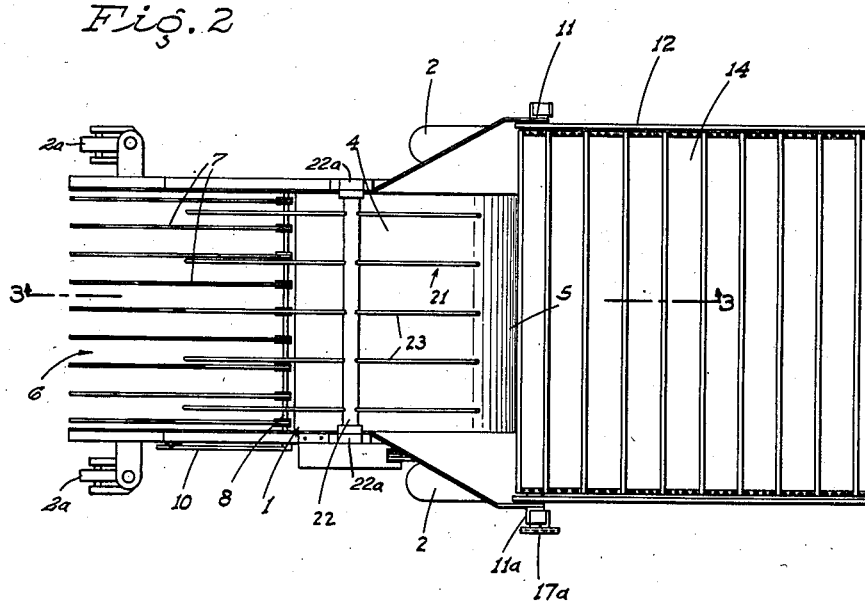
Figure 2 is a fragmentary plan view of the implement.

A reel, indicated generally at 21, is journaled in connection with the body intermediate its ends, and on a horizontal transverse axis. The reel 21 includes a central shaft 22 journaled on the body 1 at 22a. From this shaft a plurality of circumferentially, relatively widely spaced rows of tines 23 radiate; each row of tines forming a sweep. There are three such rows in the present embodiment spaced 120° apart. The outer end portions of the tines 23 curve rearwardly at 23a relative to the direction of rotation of said reel, as indicated by the arrow A in Fig. 3. The reel is normally disposed in the position shown in Figs. 1 and 3, with one row of said tines projecting downwardly substantially vertically into the body 1, whereby to form in the body ahead of said rows a receiving chamber 24 into which the crop from the upper end of the conveyor 12 is fed.

By means of the actuating and control mechanism shown in Figs. 4 and 5, which will hereinafter be described in detail, the reel 21 is intermittently rotated one-third of a turn in the direction shown by the arrow in Fig. 3.

As the implement advances the crop being picked up accumulates in the chamber 24 for a predetermined length of time, estimated to substantially fill such chamber and to form a shock. Thereafter the reel 21 rotates one-third of a turn, whereby said shock is swept rearwardly onto the bottom 4 rearwardly of the curved bottom portion 5 by the next following row of tines or sweep; said shock remaining in the body 1 until another shock is formed in the chamber 24. When such other shock is formed it likewise is pushed rearwardly by a one-third turn of the wheel. As said other shock is pushed rearwardly onto the bottom 4, the first shock is moved rearwardly onto the bottom section 6, which swings downwardly under the weight of said shock; the latter then engaging the ground between the rods 7, causing sufficient drag to slip the shock off of said bottom section 6 onto the ground clear of the rear end of the implement. It will thus be seen that when the implement advances, shocks are formed in the body 1 and intermittently discharged from the rear end thereof.

The actuating and control mechanism for the reel 21, as shown in Figs. 4 and 5, comprises the following structural arrangement:

A rotary stub shaft 25 is journaled in connection with the outside of the body adjacent its forward end in alined journals 25a disposed in one of the beams 11b of the frame 11 and a bracket 11c supported by said beam 11b. This stub shaft is constantly driven from the wheel axle 3 by a chain and sprocket unit 26. The stub shaft 25 carries a circular eccentric cam 27 and a quick-acting taper cam 28 in adjacent side by side relation. The cams 27 and 28 are engaged on the working faces thereof by a pair of corresponding upstanding levers 29 and 30 disposed to the rear of said cams but maintained in contact therewith by means of springs 31 and 32, respectively. The levers 29 and 30 are pivoted, as at 33, on hangers 33a depending from the beam 11b and bracket 11c for swinging movement lengthwise of the implement and under the influence of the cams 27 and 28.

A thrust rod 34 is pivotally connected at 34a and 34b, respectively, between the upper end of lever 29 and one end of a swinging carrier 35 on shaft 22, which carrier includes a driving pawl 36 at the other end. The pawl 36 cooperates in driving relation with a ratchet wheel 37 fixed on the reel shaft 22; said ratchet wheel including three evenly spaced driving notches 37a in which the pawl is adapted to successively engage. Upon each advance of the cam-actuated lever 29 and thrust rod 34 between the position shown in full lines and the position shown in dotted lines in Fig. 4, the reel is rotated one-third of a turn for the purpose of shifting an accumulated shock rearwardly from the chamber 24 in the manner hereinbefore described. When the reel is stationary, the row of tines next to enter the body is disposed to the rear of the point of discharge of conveyor 12, and at an upward and forward slope, so as not to interfere with free feeding from said conveyor into the chamber 24. However, when the reel begins to rotate, said next row of tines immediately enters the body and sweeps the accumulated shock rearwardly in the latter, finally assuming a stationary vertical position, at which point it then serves as the back retaining wall of chamber 24.

The reel 21 is normally held against rotation in the direction of the arrow in Fig. 3 by means of a pivotally mounted holding pawl 38, which rides in another but oppositely facing ratchet wheel 39 mounted on reel shaft 22 alongside the ratchet wheel 37. A pull rod 40 connects at 40a and 40b, respectively, between the outer end of holding pawl 38 and the upper end of lever 30. The lever 30 is swung by cam 28 in a direction to release the holding pawl 38 a moment before the cam 27 causes each one-third rotation of the reel and through the medium of the arrangement described above. There are three holding notches on the ratchet wheel 39 in symmetrical relation to the rows of tines, whereby when the holding pawl 38 is once released from one notch it rides the ratchet wheel 39 until it automatically drops into the following notch to again hold the reel stationary.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired.

I claim:

1. A shock forming implement comprising a wheel supported box like body having an upwardly curved front end, a shaft disposed transversely across the top of the body concentric with such curved end of the body, a sweep element projecting radially from the shaft and normally projecting downwardly to a point closely adjacent the lower termination of the curved end of the body, the space between the curved end of the body and the sweep then forming a chamber for the reception of crop material, means operable upon advance of the implement to pick up crop material and deliver it into said chamber, power means connected in driving relation with the shaft and operative to intermittently rotate the shaft to move said sweep from said depending position to open that end of the chamber, and separate means operative to simultaneously sweep accumulated crop material from the chamber through said opened end.

2. A machine as in claim 1 in which said last named means comprises another sweep fixed to and projecting radially out from the shaft in spaced relation to the upper termination of the curved end of the body and operable to sweep through the chamber as the first named sweep moves clear of its depending position.

3. A machine as in claim 1 in which the body has a hinged grated bottom to the rear of the curved front end thereof, such bottom being normally yieldably held in substantially horizontal position, the crop material discharged from the pocket being received by said grated bottom, the latter then being operable to yield downwardly under a predetermined weight of such material to engage the ground whereby the frictional drag of the material against the ground will drag the material from the grated bottom.

4. A shock forming implement comprising a wheel supported box like body having an upwardly curved front end, a shaft disposed transversely across the body concentric with such curved end, three sweeps secured to and projecting radially out from the shaft and spaced 120 degrees apart, one such sweep normally depending vertically downward into the body to a point closely adjacent the lower termination of the curved end of the body, the space between the curved end of the body and such depending sweep then forming a chamber for the reception of crop material, means operable upon advance of the implement to pick up crop material and deliver it into said chamber, power means connected in driving relation with the shaft and operative to intermittently rotate the shaft one-third of a revolution whereby to move the normally depending sweep from its said depending position and simultaneously move the next succeeding sweep through the curved end of the body to engage and discharge the accumulated crop material therefrom, such latter sweep then coming to rest in downwardly depending relation to again form with the curved end of the body a receiving chamber for the reception of crop material.

5. A machine as in claim 4 including means to hold the shaft against rotation between the periods of intermittent rotation thereof.

6. A machine as in claim 5 in which the shaft rotating and holding means comprises two ratchet wheels fixed to the shaft, one ratchet wheel facing in the direction of rotation of the shaft and the other facing in the opposite direction, a pawl normally engaging each ratchet wheel, power operated cam and link means connected with said pawls and operative to intermittently disengage the pawl from the first named ratchet and to then operate the other pawl against the second ratchet to effect rotation of the shaft one third of a revolution and to then re-engage the pawl with the first named ratchet.

7. A shock forming and discharging implement comprising a box-like wheel mounted body, including a two part bottom, one part being fixed stationary and being substantially imperforate and the other part being a continuation of the first part and hinged thereto for vertical swinging movement and formed of rods spaced apart transversely of the body, springs yieldably holding the rods in normally horizontal position, said springs being loaded to yield only under the influence of a predetermined weight of material disposed on the rods, means operable upon advance of the implement to pick up crop material and discharge into the body onto the first portion of the floor, and means to intermittently sweep accumulated material from the first portion of the floor onto the rods.

ELMER L. ATKINSON.

REFERENCES CITED

The following references are of record in the file of this patent:

UNITED STATES PATENTS

| Number | Name | Date |
|---|---|---|
| 1,759,263 | Kniep et al. | May 20, 1930 |